Figure 1:
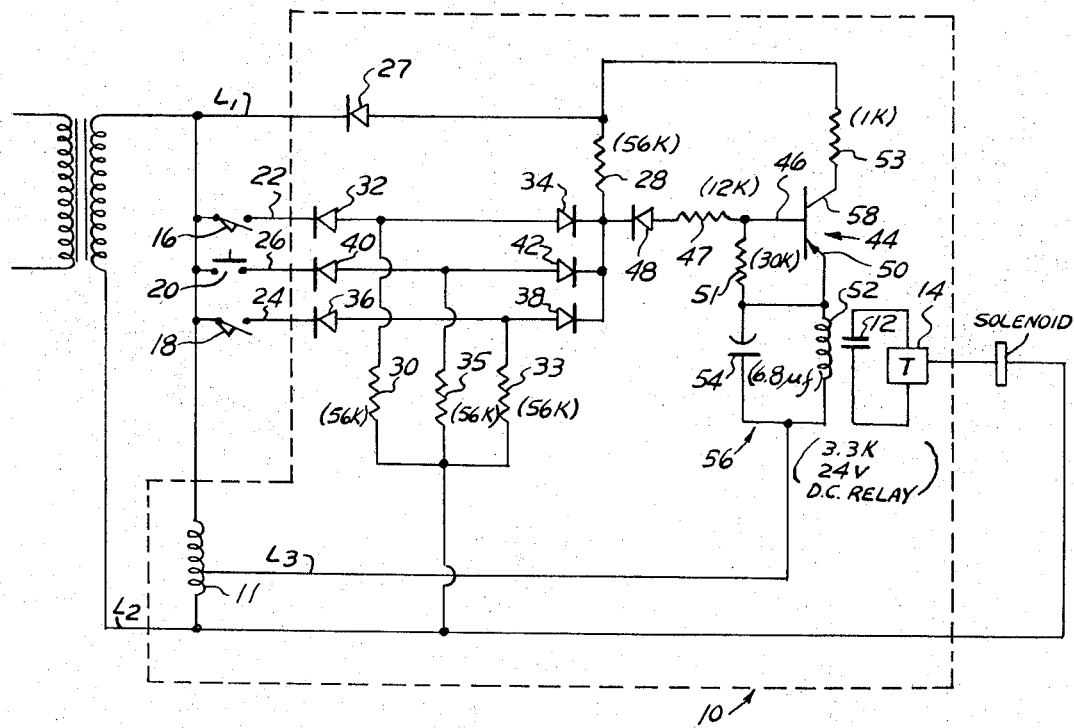

United States Patent [19]
Kosco

[11] 3,774,235
[45] Nov. 20, 1973

[54] ALTERNATING CURRENT STATIC CONTROL SYSTEM

[75] Inventor: William C. Kosco, Southfield, Mich.

[73] Assignee: La Salle Machine Tool, Inc., Warren, Mich.

[22] Filed: July 14, 1971

[21] Appl. No.: 162,591

[52] U.S. Cl............ 307/218, 307/252 W, 307/254, 317/148.5
[51] Int. Cl. ......................................... H03k 17/00
[58] Field of Search ............ 317/148.5 R, 148.5 B, 317/215; 307/218, 293, 210, 252 N

[56] References Cited
UNITED STATES PATENTS

| | | | |
|---|---|---|---|
| 3,272,991 | 9/1966 | Lutsch et al. | 307/218 |
| 3,316,462 | 4/1967 | Moe | 317/148.5 R |
| 3,084,338 | 4/1963 | Mauer et al. | 307/215 X |
| 3,329,869 | 7/1967 | Obenhaus | 317/148.5 B |

FOREIGN PATENTS OR APPLICATIONS 984,928   3/1965   Great Britain...................... 307/219

Primary Examiner—John W. Huckert
Assistant Examiner—B. P. Davis
Attorney—Finn G. Olsen et al.

[57] ABSTRACT

An alternating current solid state control system in which alternating current input signals are applied directly to the control system without requiring any initial signal conditioning so as to provide logic operational capabilities substantially the same as those obtainable using standard direct current static control devices. The voltage drop at a particular point in the system is compared to a reference voltage so that in response to a predetermined voltage drop condition corresponding to the logic control function to be obtained, a desired current flow is created.

11 Claims, 2 Drawing Figures

3,774,235

INVENTOR
WILLIAM C. KOSCO
BY Olsen and Stephenson
ATTORNEYS

ALTERNATING CURRENT STATIC CONTROL SYSTEM

BACKGROUND OF THE INVENTION

Conventional solid state control systems for controlling machine control devices such as motor starters, solenoids, and the like, which operate on alternating current, employ AC to DC converter systems for converting the AC machine, information signals to DC logic levels. Logical manipulations are then performed upon these information signals at the DC logic level to effect a decision as to the required status of the machine control devices. The decision signal must then be converted to the AC control voltage level to effect the desired AC machine function. These conversion requirements introduce cost and complexity into a variety of control systems such as machine tool systems. The principal object of the present invention, therefore, is to provide solid state control systems which operate directly from alternating current signals with a logic operational capability functionally identical to standard direct current static control elements such as AND gates and OR gates.

SUMMARY OF THE INVENTION

The system of this invention employs a solid state parallel logic network in which all input and output signal devices are connected to a common power bus, typically 110 volts, 50 or 60 hertz. This enables the AC pilot and control components to display their signal status totally independent of any other signal condition. The logical state of an element can thus be determined without knowledge of the logical state of an adjacent element, unlike conventional systems which use serial logic or relay devices. The system of this invention is assembled so that a predetermined voltage drop across a resistor in the system occurs in response to the existence of the logic function which the system is to perform. In response to the existence of this voltage drop, current from a reference voltage line can flow through the resistor so as to trigger an associated transistor and provide for the desired current flow indicating the existence of the predetermined logic function. More specifically, in the AND gate form of the system of this invention, the predetermined voltage drop across the resistor occurs only when conditions exist allowing current to flow through all of the input lines in the AND gate system. In the OR gate system of this invention, the predetermined voltage drop across the resistor occurs in response to flow of current through any one of the input lines for the OR gate system. As a result, the system of this invention enables the performing of logic functions corresponding to the logic functions obtainable with conventional DC static control logic elements directly from the AC signals thus eliminating the conventional requirement for initially converting AC to DC signals.

Figure 2:
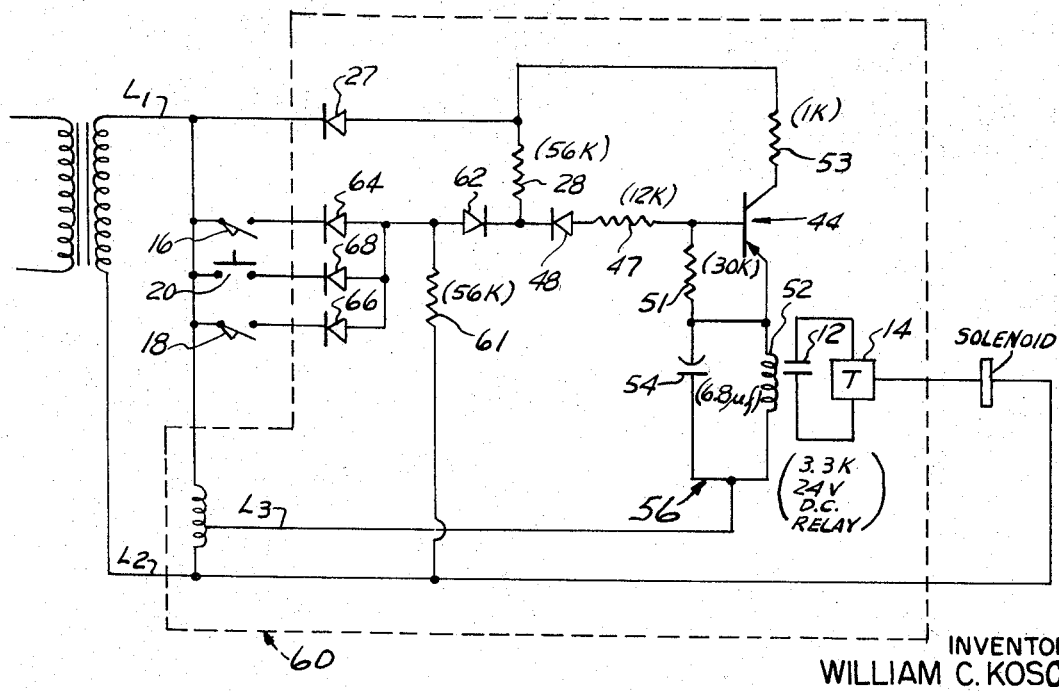

Further objects, features and advantages of this invention will become apparent from a consideration of the following description, the appended claims, and the accompanying drawing in which:

FIG. 1 is a wiring diagram illustrating the AND gate embodiment of the invention; and FIG. 2 is a wiring diagram illustrating an OR gate embodiment of the invention.

With reference to the drawing, the AND gate embodiment of the invention, indicated within the broken line generally at 10 in FIG. 1, is illustrated connected to two input lines shown at $L_1$ and $L_2$. The lines $L_1$ and $L_2$ are connected to a conventional AC voltage source so that the voltage thereacross is on the order of 110 volts, for example. A reference voltage line $L_3$ is obtained through an intermediate connection to autotransformer 11 so that the voltage drop across th lines $L_1$ and $L_3$ is less than 110 volts, for example, 40 volts. The purpose of the system 10 is to provide for closing, under predetermined conditions, of a reed relay 12 which in turn provides for energizing of an AC amplifier such as a conventional Triac circuit, indicated at 14, capable of producing a sufficiently powerful output signal to operate the machine element which is to be controlled, for example, the illustrated solenoid.

In the circuit 10, limit switches 16 and 18 and a manual switch 20 are shown and the desired AND gate function is performed by energizing of the circuit 14 only when all of the switches 16, 18 and 20 are closed. The switches 16, 18 and 20 are located in input lines 22, 24 and 26, respectively, which are connected to $L_1$ to simulate logical input conditions. The line $L_2$ is connected to the line 22 through a resistor 30 at a position between a pair of diodes 32 and 34. The diode 34 is connected to the line $L_1$ through resistor 28. The diode 32 has a much lower impedance than the combined impedance of the resistor 28 and the diode 34. When limit switch 16 is open, current will flow from $L_2$ to $L_1$ through resistor 30, diode 34, and resistor 28 resulting in a voltage drop across resistor 28. When the limit switch 16 is closed, current will flow from $L_2$ to $L_1$ through the switch 16 resulting in a predetermined lowering of the voltage drop across the resistor 28. The line $L_2$ is connected to the line 24 through a resistor 33 at a position between a pair of diodes 36 and 38. The diode 38 is connected to line $L_1$ through resistor 28, the diode 36 having an impedance much lower than the combined impedance of the diode 38 and the resistor 28. When the limit switch 18 is open, current will flow from $L_2$ to $L_1$ through resistor 33, diode 38, and resistor 28 resulting in a voltage drop across resistor 28. Consequently, on closing of the limit switch 18, current will flow from $L_2$ to $L_1$ through the switch 18 resulting in a predetermined lowering of the voltage drop across the resistor 28. Similarly the line $L_2$ is connected to the line 26 through a resistor 35 at a position between diodes 40 and 42. The diode 42 is connected to line $L_1$ through resistor 28. The diode 40 having an impedance much lower than the combined impedance of the diode 42 and the resistor 28. When the manual switch 20 is open, current will flow from $L_2$ to $L_1$ through resistor 35, diode 42, and resistor 28 resulting in a voltage drop across resistor 28. As a result, when the manual switch 20 is closed, current will flow from $L_2$ to $L_1$ through the switch 20 causing a predetermined lowering of the voltage drop across the resistor 28.

The reference voltage line $L_3$ is connected to the resistor 28 through a buffer and short duration memory circuit 56. A PNP transistor 44 in the circuit 56 has its base 46 connected through a current limiting resistor 47 and a diode 48 to the resistor 28. Diode 48 prevents a circuit from being established between $L_3$ and $L_2$ which would cause spurious charging of capacitor 54. The emitter 50 for the transistor 44 is connected to the line $L_3$ through the energizing coil 52 of the relay 12. The coil 52 is energized when the transistor conducts during the first AC half cycle. A capacitor 54, connected to the emitter 50 in parallel with the coil 52, provides short duration memory capability by discharging during each second AC half cycle when the coil 52 is not being energized by the transistor 44 to maintain the coil 52 energized. The Triac circuit 14 being of conventional solid state design is thus energized. Resistor 51 connected to the base 46 of transistor 44 and to the emitter 50 of transistor 44 provides proper biasing to determine turn on and turn off levels for the transistor 44. A resistor 53, connected to the collector 58 for transistor 44 and to $L_1$ through diode 27, provides current limiting when the transistor 44 is conducting. The diode 27 provides isolation and reverse voltage breakdown protection for the transistor 44 during each second AC half cycle when $L_1$ goes positive with respect to $L_3$.

In the operation of the system 10, when less than all of the switches 16, 18 and 20 are closed, the voltage drop across the resistor 28 is sufficiently high to maintain the transistor 44 in a non-conductive state during the first AC half cycles. The transistor is non-conductive at all times during the second half cycles due to diode 27 which becomes reverse-biased (current is blocked) when the voltage on $L_1$ is positive. Due to the manner of connection of diodes 32, 34, 36, 38, 40 and 42 to $L_2$, all the diodes are forward biased during the half cycles ($L_2$ positive). During the first half cycles, if one of the switches 16, 18 or 20 is closed, a portion of the current will be diverted through the switch to $L_1$ from its normal path through resistor 28. The current drop reduces the voltage at the junction of resistor 28 and diodes 34, 42 and 38. More current is diverted as more switches are closed. The voltage divider formed by resistors 47 and 51 is adjusted so that transistor 44 conducts only when the voltage has been lowered to a predetermined value by closing all switches 16, 18 and 20 simultaneously.

Only when all three of the switches 16, 18 and 20 are closed and $L_1$ is negative with respect to $L_3$ for the first AC half cycle, will the transistor 44 conduct current so that the coil 52 connected to the emitter 50 will be energized. At the same time the capacitor 54 is charged to the voltage drop across the coil 52. During the next AC half cycle when $L_1$ is positive with respect to $L_3$ the transistor 44 is turned off even though the input logic condition is satisfied. During this AC half cycle the capacitor 54 discharges through the coil 52 to maintain the energized state of the coil. Thus, the system 10 operates directly on alternating current inputs to the lines 22, 24 and 26 so as to perform the desired logic function corresponding to the logic function performed by a conventional AND gate, without the requirement for any auxiliary apparatus for first converting the alternating current input to direct current signals. It is to be understood of course that the switches 16, 18 and 20 are illustrative only and that three lines 22, 24 and 26 are also employed only for illustrative purposes, the system 10 being operable with any number of lines 22, 24 and 26 greater than one.

A system 60 is employing in FIG. 2 for performing the OR gate function mploying the unique concepts of this invention. The system 60 is illustrated in circuit with the switches 16, 18 and 20 previously described and the buffer and short duration memory circuit 56 employed in the system 10. In the system 60, the switches 16, 18 and 20 are connected to $L_1$ to simulate logical input conditions, and the line $L_2$ is connected to the resistor 28 through a resistor 61 at a position between a diode 62 and the diodes 64, 66 and 68 which are connected in series with the switches 16, 18 and 20, respectively. Each of the diodes 64, 66 and 68 has an impedance much lower than the combined impedance of the diode 62 and the resistor 28. When the switches 16, 18 and 20 are all open current will flow from $L_2$ to $L_1$ through resistor 28, resulting in a voltage drop across the resistor 28. When any one of the switches 16, 18 or 20 is closed, current will flow therethrough from $L_2$ to $L_1$ thereby lowering the voltage drop across the resistor 28 to a predetermined level. Thus, in the system 60, the transistor 44 is normally non-conductive and is conductive only when any one or more of the switches 16, 18 and 20 is closed. On occurrence of the latter condition, the transistor 44 becomes conductive and the buffer and short duration memory circuit 56 provides for energizing of the Triac circuit 14. Thus, in the system 60, the desired OR gate function is obtained without any initial conversion of AC input signals to DC signals. It is to be understood that the switches 16, 18 and 20 are shown for illustrative purposes only and that any desired number may be employed.

From the above description it is seen that this invention provides an alternating current static control system which is readily adaptable to any of the standard functions obtainable with static control logic elements that normally operate directly on DC current. Only the AND and OR gate functions have been illustrated, but it will be apparent to those skilled in the art that the concept of correlating the voltage drop across the resistor 28 and associating this voltage drop with a desired logic condition and the buffer and short duration memory circuit 56 can be readily adapted to any desired logic functions or combinations thereof.

The values of resistors and capacitors in the circuits 10 and 60 are shown in parentheses in FIGS. 1 and 2 to illustrate one specific form of the invention, but it is to be understood that these values are merely illustrative of one means of implementing the invention. It is also to be understood that all the diodes in the systems could be reversed and a complementary transistor used to implement the invention without departing from the concepts of this invention. Also $L_2$ and $L_3$ could be the same voltage in a particular system.

What is claimed is:

1. In an alternating current static control system, a pair of conductors connected to an alternating current source, resistor means connected directly to one of said conductors, a plurality of parallel connected signal input lines operatively connected to said conductors and to said resistor means so as to produce a predetermined voltage drop across said resistor means in response to the existence of a predetermined logic function in said input lines, a third conductor, means connecting said third conductor to said pair of conductors so that said third conductor constitutes a reference voltage line, circuit means connecting said third conductor to said resistor means, means in said circuit means providing for flow of current therethrough only when said predetermined voltage drop condition exists, and capacitor means in said circuit means chargeable in response to said current flow.

2. In an alternating current static control system according to claim 1, transistor means connected to said resistor means which conducts when the predetermined voltage drop occurs at said resistor means, second resistor means connected to said transistor means to establish the said predetermined voltage level for conduction, third resistor means connected to said transistor means to provide electric current limiting when said transistor conducts, diode means connected to said transistor means to provide reverse voltage breakdown protection and alternating current isolation, said capacitor means being connected to said transistor means and chargeable during conduction of said transistor means.

3. In an alternating current static control system according to claim 1, input diode means in each of said plurality of input lines to divert electric current in response to alternating current input signals from said first resistor means so that said predetermined voltage drop in the said resistor means can be accomplished, additional resistor means connected to said input diode means to provide a normal predetermined current level in said first resistor means when electric current is not being diverted through said input diode means in response to a said alternating current logic function.

4. In an alternating current static control system according to claim 2, amplifier means, means connecting said amplifier means to said capacitor means, said capacitor means being connected in said system so that it is capable of storing electric energy during conduction of said transistor means and providing energy to said means between periods of conduction of said transistor means.

5. An alternating current logic control system comprising resistor means having one end operatively connected to one terminal of an alternating current source, a plurality of signal input lines responsive to external logic functions, directional circuit means connected to said resistor means and operatively connecting said signal input lines in parallel with each other to the one alternating current source terminal for causing a predetermined level of current to flow through said resistor means when a preselected logic relationship exists among said input lines during corresponding first half cycles of said alternating current source and blocking the passage of current through said resistor means during the second half cycles, a storage circuit, and controllable circuit means connected to said resistor means for charging said storage circuit during said first half cycles, said storage circuit discharging during said second half cycles.

6. The logic control system of claim 5 wherein said controllable circuit means includes a pair of terminals, a control input operatively connected to said resistor means for causing conduction between said terminals in response to said predetermined current level in said resistor means, and diode means connecting one of said controllable circuit means terminals to the one alternating current terminal.

7. The logic control system of claim 6 wherein said storage circuit means includes impedance means and a capacitor means operatively connected in parallel between the other controllable circuit means terminal and the other alternating current terminal for charging said capacitor means during first alternating current half cycle and discharging said capacitor means through said impedance means during second alternating current half cycle.

8. The alternating current logic control system of claim 5 wherein said directional circuit means comprises a plurality of pairs of first and second series-connected opposed diodes, the junctions thereof being operatively connected in circuit with the other alternating current terminal;
said input lines being connected to the first diode in selected ones of said pairs; and
said resistor means being connected in circuit between each second diode and the one alternating current terminal.

9. The logic control system of claim 8 further comprising a plurality of resistor elements operatively connecting respective junctions of said diode pairs in parallel in circuit with the other alternating current terminal.

10. The logic control system of claim 5 wherein the directional circuit includes a plurality of diodes and a single diode;
said input lines selectively connected to respective ones of said plurality of diodes on one side in parallel;
all of said diodes being operatively connected to the other alternating current terminal;
said single diode being operatively connected to all of said plurality of diodes in direction of opposition therewith; and
said resistor means being connected between said single diode and the one alternating current terminal.

11. The logic control system of claim 10 further comprising a resistor element operatively connecting the junction of said single diode and said plurality of diodes in parallel to the other alternating current terminal.

* * * * *